US009117011B2

(12) United States Patent
Berry, Jr. et al.

(10) Patent No.: US 9,117,011 B2
(45) Date of Patent: Aug. 25, 2015

(54) CHARACTERIZATION AND FUNCTIONAL TEST IN A PROCESSOR OR SYSTEM UTILIZING CRITICAL PATH MONITOR TO DYNAMICALLY MANAGE OPERATIONAL TIMING MARGIN

(71) Applicant: International Business Machines Corporation, Armonk, NY (US)

(72) Inventors: Robert W. Berry, Jr., Round Rock, TX (US); Alan J. Drake, Round Rock, TX (US); Michael S. Floyd, Cedar Park, TX (US); Richard L. Willaman, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 235 days.

(21) Appl. No.: 13/770,447

(22) Filed: Feb. 19, 2013

(65) Prior Publication Data

US 2014/0237302 A1 Aug. 21, 2014

(51) Int. Cl.
*G06F 11/00* (2006.01)
*G06F 11/34* (2006.01)

(52) U.S. Cl.
CPC .................. *G06F 11/3409* (2013.01)

(58) Field of Classification Search
CPC ........................................................ G06F 11/348
See application file for complete search history.

(56) References Cited

U.S. PATENT DOCUMENTS

| 5,634,001 | A  | * | 5/1997  | Mittl et al. ...................... 714/33  |
| 6,308,292 | B1 | * | 10/2001 | Fusco ............................ 714/738 |
| 6,347,287 | B1 | * | 2/2002  | Beckett et al. ................... 702/89  |
| 8,176,445 | B1 | * | 5/2012  | Qian ............................... 716/52  |
| 8,839,173 | B1 | * | 9/2014  | Jiang et al. ...................... 716/114 |
| 2004/0093388 | A1 | * | 5/2004  | Chandler et al. ............... 709/208 |
| 2008/0004829 | A1 | * | 1/2008  | Gorin ............................. 702/108 |
| 2008/0189090 | A1 | * | 8/2008  | Aikawa et al. ...................... 703/4 |
| 2009/0312848 | A1 |   | 12/2009 | Anderson et al. |
| 2010/0070787 | A1 | * | 3/2010  | Bieswanger et al. ......... 713/322 |
| 2012/0005513 | A1 |   | 1/2012  | Brock et al. |
| 2012/0043982 | A1 |   | 2/2012  | Carpenter et al. |

(Continued)

OTHER PUBLICATIONS

Lefurgy, Charles, et al., "Active Management of Timing Guardband to Save Energy in POWER7", Proc. of the 44th Annual IEEE/ACM Int'l. Symposium on Microarchitecture, pp. 1-11 (2011).

(Continued)

*Primary Examiner* — Christopher McCarthy
(74) *Attorney, Agent, or Firm* — Steven L. Bennett; Jack V. Musgrove

(57) ABSTRACT

Guardband validation for a device having a critical path monitor involves first applying multiple calibration settings to the monitor during functional operation of the processor, and recording corresponding guardbands which result in reduced timing margin. A desired guardband can later be selected for validation. The calibration settings can be based on delays for a critical path. A calibration test procedure can be used to determine the calibration delays for different operating frequencies or voltages that are set or, alternatively, the calibration delays can be set and resultant frequencies measured which are used to calculate the guardband amounts. The critical path monitor may include a modified calibration delay circuit which provides a calibrated delay signal to a critical path synthesis circuit, and the multiple calibration settings can be applied by changing delay taps of the calibration delay circuit in response to a bias delay signal from a power management controller.

24 Claims, 7 Drawing Sheets

(56) References Cited

U.S. PATENT DOCUMENTS

| | | | |
|---|---|---|---|
| 2012/0159276 A1* | 6/2012 | Zandian et al. | 714/734 |
| 2012/0218034 A1* | 8/2012 | Turullols et al. | 327/540 |
| 2013/0117589 A1* | 5/2013 | Satyamoorthy et al. | 713/320 |
| 2013/0339777 A1* | 12/2013 | Varma et al. | 713/340 |

OTHER PUBLICATIONS

Liu, Qunzeng, et al., "Capturing Post-Silicon Variations using a Representative Critical Path," IEEE Trans. on Computer-Aided Design of Integrated Circuits and Systems, vol. 29, n. 2, pp. 211-222 (2009).

* cited by examiner

CHARACTERIZATION AND FUNCTIONAL TEST IN A PROCESSOR OR SYSTEM UTILIZING CRITICAL PATH MONITOR TO DYNAMICALLY MANAGE OPERATIONAL TIMING MARGIN

BACKGROUND OF THE INVENTION

1. Field of the Invention

The present invention generally relates to computer systems, and more particularly to a method of guardband testing for a system having a critical path monitor used to optimize processor frequency.

2. Description of the Related Art

Electronic devices such as computer systems or their components must be tested for quality control purposes to ensure that the product as shipped will function as intended. However, all testing methodologies have their limitations and can still result in mischaracterization of performance, for example, due to measurement errors, or due to process or environmental variations. In order to provide additional assurance of proper operation, designers build a safety margin into product specifications such as lower frequency or higher voltage. This additional safety margin is referred to as a guardband. The guardband thus ensures that even with testing uncertainty and worst case environment the product meets the stated minimum specifications with a high degree of confidence.

While guardbands can guarantee proper operation under most conditions, they have several disadvantages. When guardbands are added, some devices that would have otherwise passed quality control testing will end up failing. Thus, from the standpoint of yield, the smaller the guardband the better. Guardbands can also lead to inefficient operation of the device. For example, process, voltage, and temperature variations cause timing variation within an integrated circuit design such as a microprocessor and the guardband must be such that it protects the absolute worst case that can theoretically occur, making it necessary to provide timing margins that compromise the potential performance of the device.

In a processor core, the maximum frequency of the processor clock is dictated by the delay of a critical path within the processor, that is, a path that, at the present operating temperature and voltage, will cause the processor to fail when the frequency of the processor clock is raised above a particular limit. The critical path may be a single critical path for all operating conditions, or the critical path may change, for example, at different operating temperatures or at different voltages. Critical path monitor (CPM) circuits have been implemented that simulate the critical path or paths, and provide information regarding the critical path delay of a processor or other integrated circuit device. CPMs can synthesize critical path timing through such delay elements as wired interconnects within the IC and/or logic gates of the IC, and provide information to a phase-locked loop that generates the processor clock to provide real-time feedback of variations in the critical path delay, e.g., variation of the critical path delay with dynamic changes in the power supply voltage at particular locations within the integrated circuit device. CPMs thus allow reduction in margin (guardband) for thermal and voltage conditions in the system instead of having to always account for worst case conditions, and thereby increase operational efficiency.

FIG. 1 illustrates the basic components for one example of a CPM circuit 2 which include a pulse generator 3, a calibration delay 4, a critical path synthesis 5, and an edge detector 6 to implement a timing-margin-to-digital conversion function. Pulse generator 3 receives a signal from the clock core and creates a timing edge synchronized to the system clock. The timing edge passes through calibration delay 4 which is used to compensate for process variation, operating point changes, and margin variation at different frequencies, and then through critical path synthesis 5 which will track with (mirror) the overall processor circuit margin. After passing through the synthesis block, the edge is latched in the edge detector by the system clock. The delay from pulse generation to edge detection is typically one clock cycle but can be multiple clock signals to improve accuracy. After the edge detector there is some signal conditioning and two output signals. An encoder 7 is used to generate a 5-bit window of the 12-bit edge detector which is then fed directly to a digital phase-lock loop (DPLL) and is used to adjust frequency to respond to changes in timing margin. The edge detector is essentially a delay line with latch elements attached at each interval. As the timing signal progresses along this delay line it flips the latch bits from 0 to 1. The location of the 1-to-0 transition that occurs when the system clock arrives marks the timing point for a given cycle. The timing margin at a given cycle is the difference between the current CPM bit position and the calibration bit position.

Calibration of the CPM is key to ensuring proper frequency and timing margin. In this example, CPMs are calibrated by adding or subtracting calibration delay from the circuit until the DPLL achieves a target frequency at a given voltage, temperature, and workload. A valid production calibration point is found by measuring the delay of the synthesis path required to achieve the target frequency. Calibration is typically done at both ends of the intended voltage operating range. Calibration inaccuracy can occur and falls into two categories. The first is variation between the tester and the system running the same conditions and workload. The second is driven by the fact that a limited number of calibrations points (usually one) need to control the CPM through the full operational voltage range. By comparing the calibration result collected at the two voltage points the designer can measure how well the CPM tracks with the tester measured frequency. Any variation will result in divergence from the target frequency over changing voltage leading to excessive or insufficient margin.

SUMMARY OF THE INVENTION

The present invention is generally directed to a method of guardband validation for an electronic device such as a processor having a monitor which controls a functional clock frequency based on current operating conditions. In an illustrative implementation, multiple calibration settings are applied to the monitor during functional operation of the processor at one or more operating points. For each calibration setting, a corresponding stress guardband is recorded. The stress guardbands result in a reduced timing margin for the processor, i.e., less than the normal operational timing margin. A desired one of the stress guardbands can later be selected for validation via subsequent guardband testing, while the monitor is active and using the calibration setting that corresponds to the selected stress guardband.

In an implementation wherein the monitor is a critical path monitor, multiple calibration settings are based on multiple calibration delays for a critical path used by the monitor. A calibration test procedure can be used to determine the calibration delays for different operating frequencies or voltages that are set or, alternatively, the calibration delays can be set and resultant frequencies measured which are used to calculate the guardband amounts. The critical path monitor may include a modified calibration delay circuit which provides a calibrated delay signal to a critical path synthesis circuit, and the multiple calibration settings can be applied by changing delay taps of the calibration delay circuit in response to a bias delay signal from a power management controller.

An additional innovation that can be implemented with the present invention is to use a critical path that most closely tracks the maximum operating frequency of the processor over an operating voltage range, and keeps the stress guardband between a maximum stress guardband and a minimum stress guardband, wherein the maximum stress guardband is less than a minimum nominal guardband which accounts for frequency mistracking across at least two operating points due to calibration inaccuracy.

The above as well as additional objectives, features, and advantages of the present invention will become apparent in the following detailed written description.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

While inclusion of active timing margin management circuits that control the functional operation of a computer chip can result in increased frequency or lower power operation, it creates a new problem in that it becomes harder to guardband a computer chip during test to ensure safe operation in the shipping product. Traditionally a system test procedure validates that sufficient guardband is present before the system is shipped to double-check the testing that was done during manufacturing test of the processor chip. The traditional method of ensuring margin is to then bias operating parameters, e.g., (raise) frequency and/or (lower) voltage to assess how much margin is available over a large sample of processors and workloads. The system must still pass despite these "stress" conditions. For example, during traditional test the guardband of the processor chip might be cut by more than half by both dropping voltage and raising frequency and an assortment of stressful workloads are run to ensure that no failures result. Active timing margin management, such as a CPM-DPLL control system, will prevent this testing method since it controls the frequency to preserve the calibrated guardband and will dynamically adjust to voltage changes to effectively "undo" any stress or bias applied to the chip during test. It would, therefore, be desirable to devise an improved method of guardband testing which could validate that while using active timing margin management there is still sufficient margin in the system. It would be further advantageous if the method could also ensure that the CPM accuracy and mistracking is in an acceptable range.

The present invention achieves these advantages by leveraging additional tester collected data to intentionally shift the calibration point and thereby reduce margin in a measureable way. Alternate system test strategies have been devised wherein the CPMs can also be calibrated with this reduced guardband amount during manufacturing and that setting can be applied during the guardband validation phase of system test. There are multiple implementations that can deliver this "stress" function. One implementation involves introducing one or more additional calibration points at the tester where the calibration is done at an increased frequency or reduced voltage (or both). An alternative implementation removes margin by changing the delay taps used for calibration and measure the resultant frequencies until the desired guardband is reached. These implementations are described in more detail further below.

Figure 1:
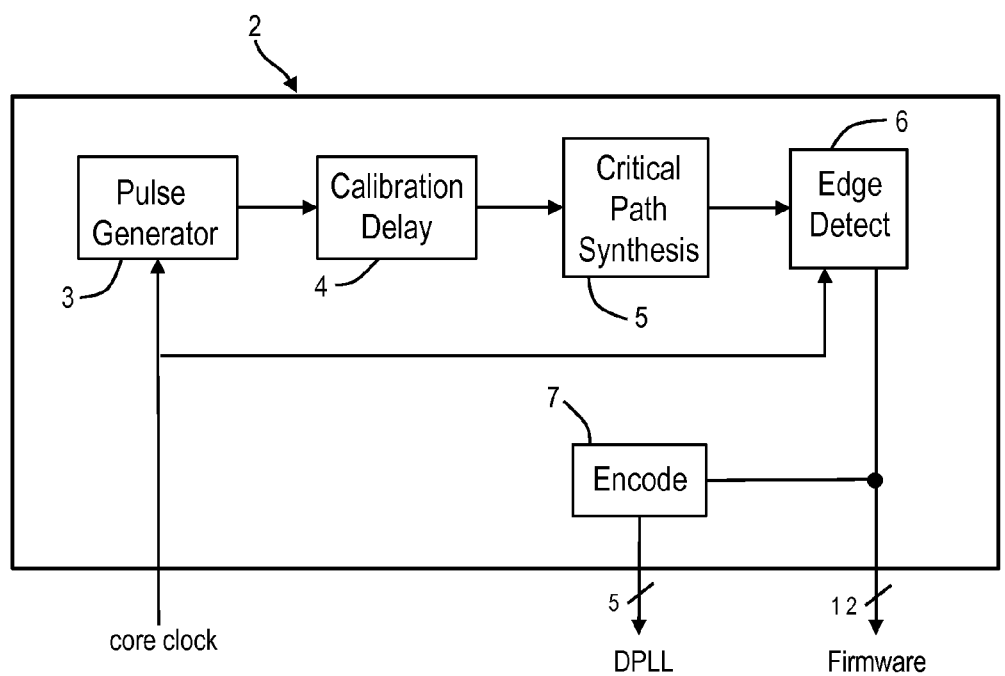
FIG. 1 is a block diagram of a conventional critical path monitor (CPM) circuit.
Figure 2:
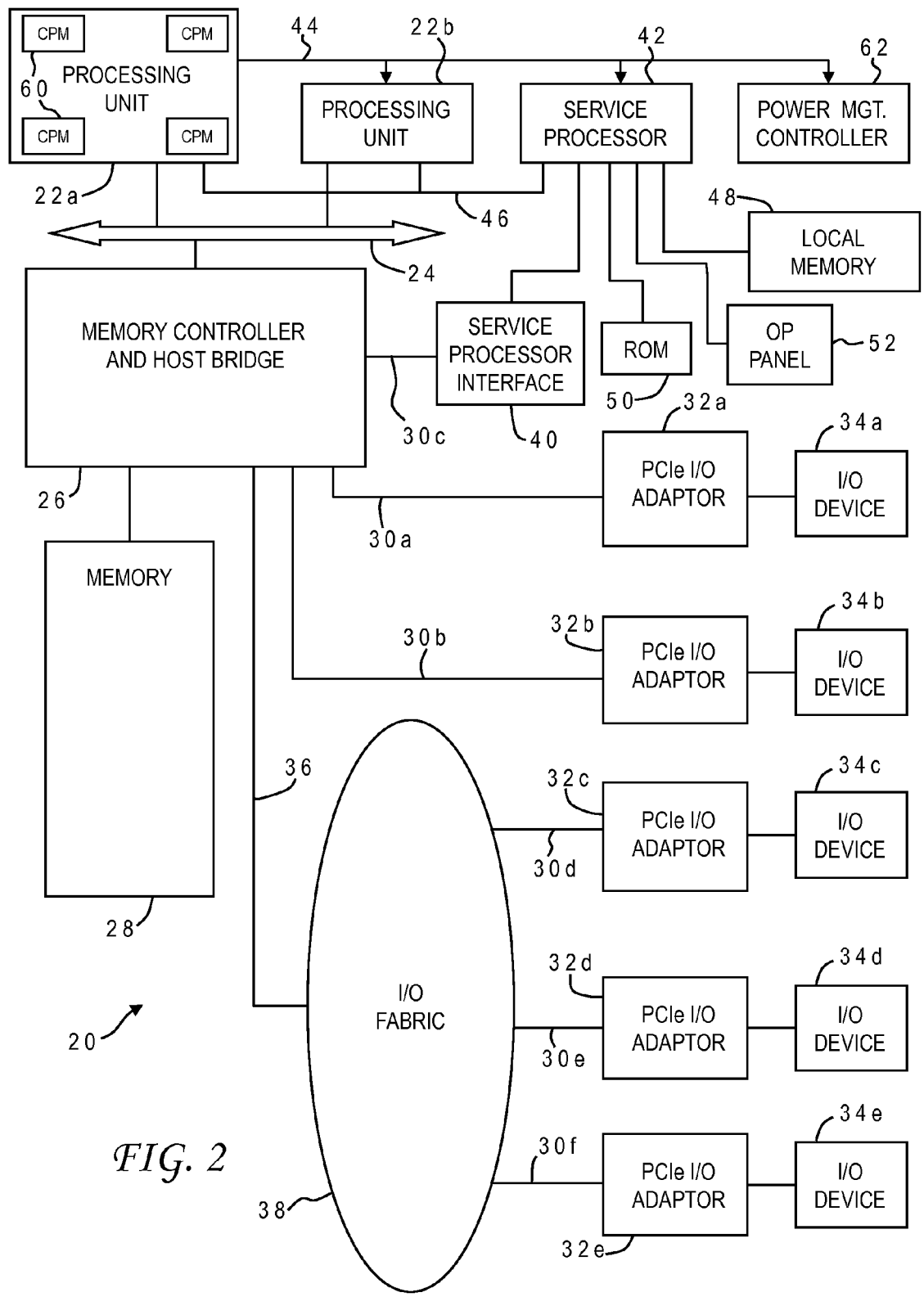
FIG. 2 is a block diagram of a computer system having one or more processors which use CPM circuits that can be recalibrated for guardband testing in accordance with one implementation of the present invention.

With reference now to the figures, and in particular with reference to FIG. 2, there is depicted one embodiment 20 of a computer system in which constructed in accordance with the present invention. Computer system 20 is a symmetric multiprocessor (SMP) system having a plurality of processors 22a, 22b connected to a system bus 24. Only two processors are shown but the system may have many more. System bus 24 is further connected to a combined memory controller/host bridge (MC/HB) 26 which provides an interface to system memory 28. System memory 28 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches.

MC/HB 26 also has an interface to peripheral component interconnect (PCI) Express links 30a, 30b, 30c. Each PCI Express (PCIe) link 30a, 30b is connected to a respective PCIe adaptor 32a, 32b, and each PCIe adaptor 32a, 32b is connected to a respective input/output (I/O) device 34a, 34b. MC/HB 26 may additionally have an interface to an I/O bus 36 which is connected to a switch (I/O fabric) 38. Switch 38 provides a fan-out for the I/O bus to a plurality of PCI links 30d, 30e, 30f. These PCI links are connected to more PCIe adaptors 32c, 32d, 32e which in turn support more I/O devices 34c, 34d, 34e. The I/O devices may include, without limitation, a keyboard, a graphical pointing device (mouse), a microphone, a display device, speakers, a permanent storage device (hard disk drive) or an array of such storage devices, an optical disk drive, and a network card. Each PCIe adaptor provides an interface between the PCI link and the respective I/O device. MC/HB 26 provides a low latency path through which processors 22a, 22b may access PCI devices mapped anywhere within bus memory or I/O address spaces. MC/HB 26 further provides a high bandwidth path to allow the PCI devices to access memory 28. Switch 38 may provide peer-to-peer communications between different endpoints and this data traffic does not need to be forwarded to MC/HB 26 if it does not involve cache-coherent memory transfers. Switch 38 is shown as a separate logical component but it could be integrated into MC/HB 26.

In this embodiment, link 30c connects MC/HB 26 to a service processor interface 40 to allow communications with a service processor 42. Service processor 42 is connected to processors 22a, 22b via a JTAG interface 44, and uses an attention line 46 which interrupts the operation of processors 22a, 22b. Service processor 42 may have its own local memory 48, and is connected to read-only memory (ROM) 50 which stores various program instructions for system startup. Service processor 42 may also have access to a hardware operator panel 52 to provide system status and diagnostic information. Operator panel 52 may also be used as an interface to a test system which can oversee the calibration and guardband testing procedures of the present invention.

In alternative embodiments computer system 20 may include modifications of these hardware components or their interconnections, or additional components, so the depicted example should not be construed as implying any architectural limitations with respect to the present invention. More generally, the invention could be implemented in any IC that would benefit from variable boosted frequency or reduced average operating power.

When computer system 20 is initially powered up, service processor 42 uses JTAG interface 44 to interrogate the system (host) processors 22a, 22b and MC/HB 26. After completing the interrogation, service processor 42 acquires an inventory and topology for computer system 20. Service processor 42 then executes various tests such as built-in-self-tests (BISTs), basic assurance tests (BATs), and memory tests on the components of computer system 20. Any error information for failures detected during the testing is reported by service processor 42 to operator panel 52. If a valid configuration of system resources is still possible after taking out any components found to be faulty during the testing then computer system 20 is allowed to proceed. Executable code is loaded into memory 28 and service processor 42 releases host processors 22a, 22b for execution of the program code, e.g., an operating system (OS) which is used to launch applications and in particular the guardband validation application of the present invention, results of which may be stored in a hard disk drive of the system (an I/O device 34). While host processors 22a, 22b are executing program code, service processor 42 may enter a mode of monitoring and reporting any operating parameters or errors, such as the cooling fan speed and operation, thermal sensors, power supply regulators, and recoverable and non-recoverable errors reported by any of processors 22a, 22b, memory 28, and MC/HB 26. Service processor 42 may take further action based on the type of errors or defined thresholds.

During operation of computer system 20, the performance of processors 22a, 22b can be optimized using active timing margin management, preferably by placing multiple CPM circuits 60 within a functional clock boundary, such as a single processor core. Placing several CPMs on each core allows the system to capture any voltage or thermal variation across the unit. Multiple CPMs also provide redundancy for improved reliability over the processor's lifetime. The CPM outputs can be merged together at a control point such that the CPM requesting the slowest operation becomes the basis for margin adjustment. In general, the CPMs allow a processor (or other system component) to run at a target frequency that is just below the maximum allowable frequency ($F_{max}$) for a given voltage. CPM circuits preferably offer multiple representative critical paths which can be selected either automatically by hardware or programmably by firmware. The path chosen can be based upon on the present operating voltage, temperature, or other environmental attribute of the IC at any given time such as the workload running or amount of noise present in the system. These paths typically represent different circuit structures or transistor device types. Additional details of the construction and operation of the CPMs may be found in U.S. Patent Application Publication No. 2012/0043982 which is hereby incorporated.

Figure 3:
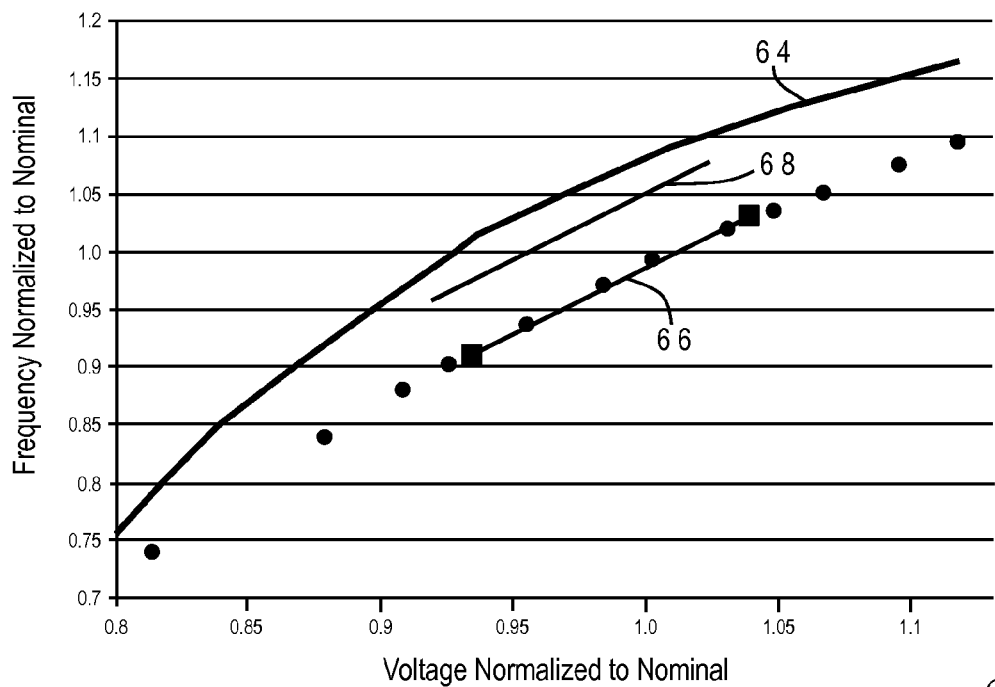
FIG. 3 is a graph illustrating a curve for a maximum processor frequency ($F_{max}$) as a function of voltage wherein a normal calibration based on CPM production calibration points is shifted to reduce margin in accordance with one implementation of the present invention.

CPMs 60 have been modified to allow for the improved guardband testing of the present invention. In one embodiment, the stress function is delivered by implementing one or more additional calibration points for each CPM, wherein the recalibration takes place at an increased frequency or reduced voltage as compared to the production calibration point. Since margin needs to be assessed in terms of both voltage and frequency, it is important to be able to implement calibrations that are sensitive to both as the relationship is not always linear. FIG. 3 is a graph showing a curve 64 representing $F_{max}$ as a function of normalized voltage and normalized frequency. The circle data points represent CPM frequency for production calibration conditions, so the normal operation of the device can be characterized by a linear function 66 based on the two production calibration points indicated by square data points. FIG. 3 illustrates how new calibration points are established with margin removed for bias conditions 68. The new calibration points can be established by any appropriate logic circuit; in the preferred implementation computer system 20 includes a power management controller 62 (FIG. 2) which can set new calibration points dynamically, i.e., on-the-fly. Although power management controller 62 is shown as a separate component of computer system 20, it may be imbedded with a processor core, and multiple controllers may be employed. Power management controller 62 receive the bias calibration points from an external source (i.e., the designer or test system), or can compute the new calibration points based on the known $F_{max}$ curve and the known production calibration points. For example, controller 62 can include circuitry to push the calibration points to within some predetermined percentage of the difference between the $F_{max}$ curve and the frequency for normal operation. This alternate calibration data can be stored in the same way that the production data is stored for selective use in characterization and production testing. The primary benefit of this approach is for cases where voltage guardband is key as it can be tested into the calibration leveraging voltage bias.

Ideally, a two point calibration would suffice, but there may be instances where the $F_{max}$ curve is irregular, the CPM does not track well to $F_{max}$ over the entire operating range, or different margins may be required at different voltages due to system needs. In those cases, a multipoint calibration may be used to better approximate the chip $F_{max}$. In a further example, the selected path is calibrated well between nominal and turbo voltage values, but due to path mistracking and increased low-voltage margin, does not correspond to a powersave point. If only one calibration point were used, significant error accrues by the time the powersave point is reached.

A solution is to calibrate at one or more additional points. For example, when the processor is operating below the nominal voltage, the nominal-to-powersave calibrations can be used for path selection, and above nominal, the turbo-to-nominal calibrations can be used. As voltage crosses the nominal point, calibrations are changed. Some amount of hysteresis can be applied to prevent oscillation of the calibrations. In essence different CPM calibrations or paths are selected to form a linear piecewise curve fit against the operational Fmax curve of the IC.

Figure 4:
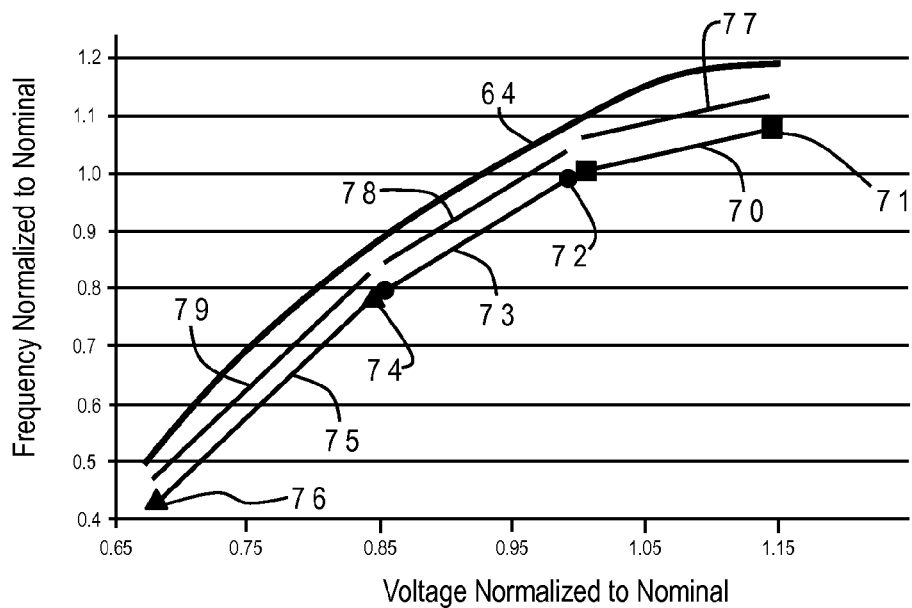
FIG. 4 is a graph depicting a multipoint calibration method for guardband testing in a system having a powersave state, a nominal state and a turbo state in accordance with one implementation of the present invention.

Systems that use discrete operating states with little continuity between them, for example nominal, turbo, and powersave states, can have different calibrations for each state. When the state changes, the calibration can also be changed for maximum accuracy. Given test time, bounding 2-point calibration could also be taken on either side of the discrete point so that the system could be characterized over the full voltage range that dynamic operating point changes would cause at the discrete points. In FIG. 4, three calibration ranges are used. These ranges can be optimized to best fit the $F_{max}$ curve. Calibration would be done at four points, and three operating ranges would be defined based on voltage. Range 70 is used from turbo point 71 to just above calibration point 72, range 73 is used from calibration point 72 to just above calibration point 74, and range 75 is used from calibration points 74 to powersave point 76. This scheme gives accurate $F_{max}$ tracking over the widest frequency range. Corresponding bias calibration points can be used to compute three ranges 77, 78, 79 for guardband testing.

Figure 5:
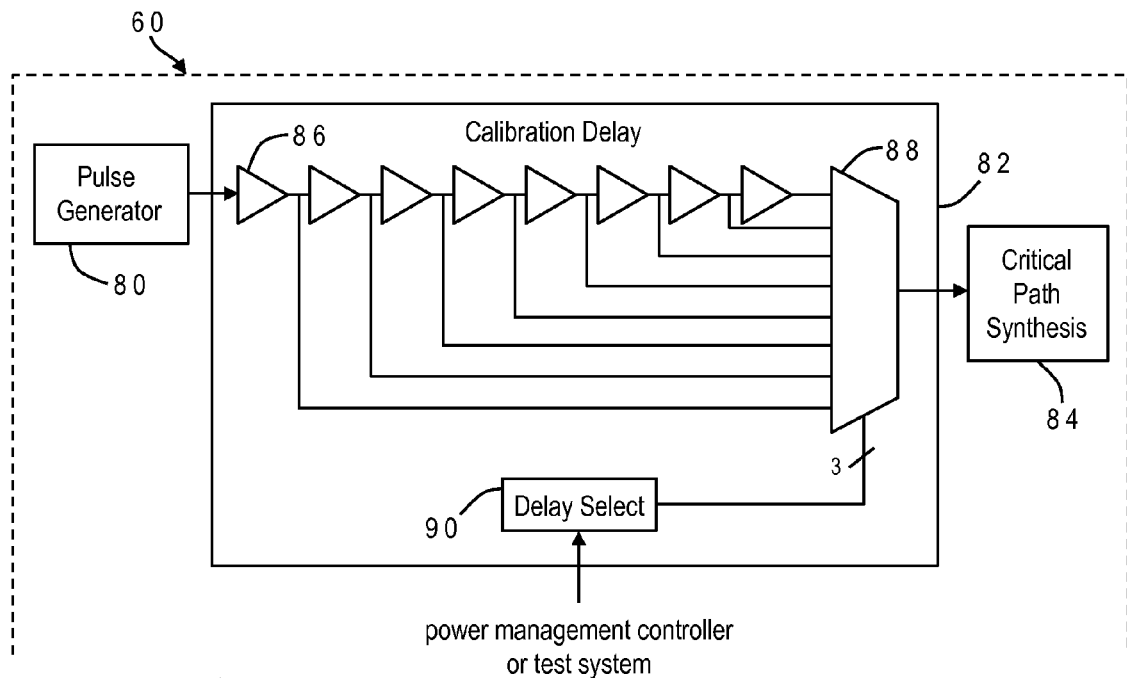
FIG. 5 is a block diagram of a CPM constructed in accordance with one embodiment of the present invention wherein the delay taps used for calibration are changed to remove margin.

Once the method of establishing calibration points has been selected based on the foregoing, the tester can then begin the determination of the specific values to be used during the bias calibration, i.e., what are the additional guardbands to the original calibration. One approach for characterization and test is to change the delay taps used for calibration, and measure the resultant frequencies until the desired guardband is reached. FIG. 5 illustrates an exemplary CPM 60 in which a pulse generator 80 supplies a clock signal to a calibration delay circuit 82 which in turn provides a calibrated signal to a critical path synthesis block 84. Critical path synthesis block 84 provides a critical path timing to an edge detector (not shown). In this case, however, calibration delay circuit 82 is modified to allow power management controller 62 to select a bias delay signal. In the example shown calibration delay circuit 82 is 8-bit, i.e., it has eight delay elements 86, but in the preferred implementation there would be enough delay elements to cover the needed process variation, operating conditions, and guardbands of the target system, in addition to the desired operational frequency range. This number might be 64 delay elements when the delay is on the order of picoseconds. Each delay element has an output connected to an input of a multiplexer 88 which is controlled by a delay select register 90. The value in delay select register 90 can be set by power management controller 62, allowing adjustment of the margin by the amount of delay in each adjustment step. By changing this setting the system can add or remove margin from the CPM for bias operation. The primary benefit of this approach is that it does not require as much manufacturing time or data, and it can cover multiple steps (amount of guardband testing choices) only limited to the granularity of the delay steps, thereby enabling full characterization to identify the true margin available for each circuit with satisfactory granularity. This approach does not differentiate between voltage and frequency margins, so it does not rely upon an assumed sensitivity to voltage bias which can change across the voltage range.

A further alternative to the foregoing approach is to allow the edge detect point in the edge detector to be moved. Typically this will have a larger granularity and fewer available steps when compared with the programmable calibration delay.

Figure 6:
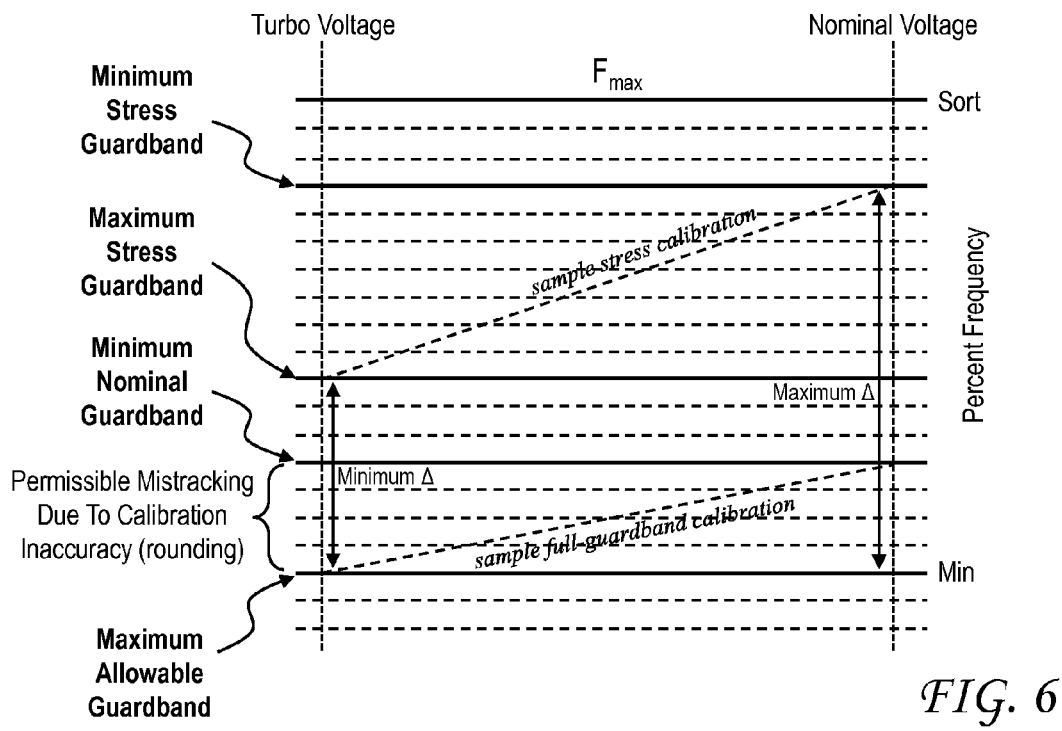
FIG. 6 is a chart illustrating preferred rules for CPM calibration to achieve Optimal $F_{max}$ tracking for the full guardband testing points across the operating range while keeping corresponding stress guardband testing points with desired minimum and maximum offsets.

An additional innovation that can be implemented with the present invention involves the path and delay selection algorithm to achieve (i) the best $F_{max}$ tracking for the "full guardband" testing points across the operating range (e.g., nominal voltage to turbo voltage), and (ii) corresponding "stress guardband" testing points with desired minimum and maximum offset between those two points. Once the manufacturing data is collected, algorithms can then be run to pick which path or combination of paths will provide the best tracking to $F_{max}$ over the voltage range, ensuring a proper guardband exists yet maintaining the most power efficiency lost to mistracking which causes too much margin. It is further preferable to make sure that the calibration chosen at the stress point is testing with at least a minimal amount of margin removed (i.e., making sure that it is stressful enough) but not so much that it causes false failures by running with zero or negative margin. What makes this task difficult is the discrete nature of the delay steps which leads to a rounding error (calibration inaccuracy) that may cause the resultant frequency to land with more or less than the ideal amount of guardband validation reduction. FIG. 6 illustrates the algorithm's goal. There is a maximum allowable guardband that corresponds to a minimum operating frequency for the device. However, at nominal voltage there is a possible error in the frequency due to calibration mistracking, leading to a minimum nominal guardband. The minimum amount of margin removed for guardband testing (minimum delta) is accordingly set higher than the minimum nominal guardband, resulting in a maximum stress guardband. To ensure sufficient stress and in order to avoid false failures, there is a minimum stress guardband (ensure sufficient stress) and a maximum amount of margin that can be removed (avoid false failures). An example result is the two dashed lines representing the calibration points for full guardband operation and stress guardband operation between the two voltage points turbo and nominal.

Figure 7:
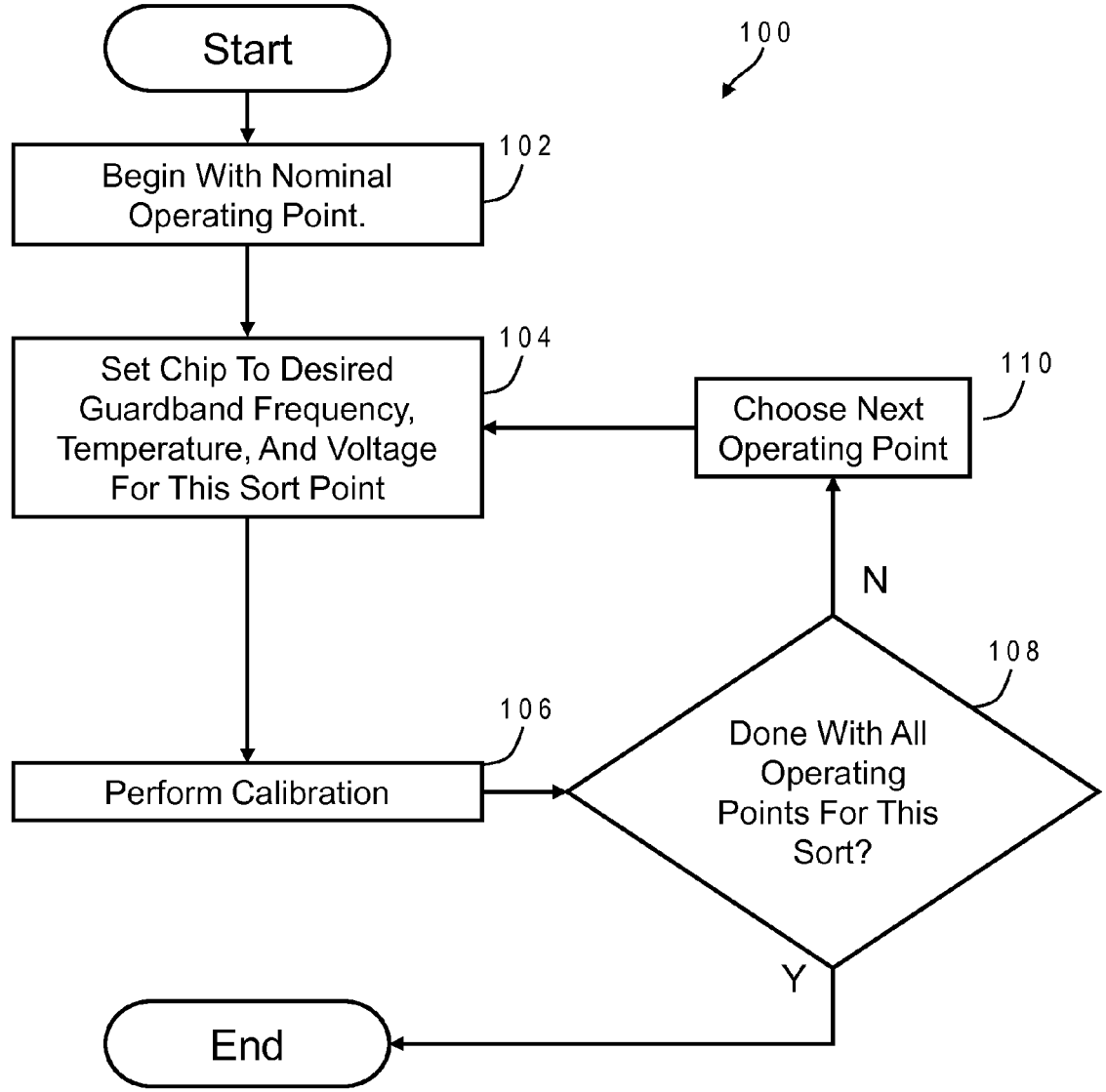
FIG. 7 is a chart illustrating the logical flow for a base calibration technique in accordance with a general implementation of the present invention.
Figure 8:
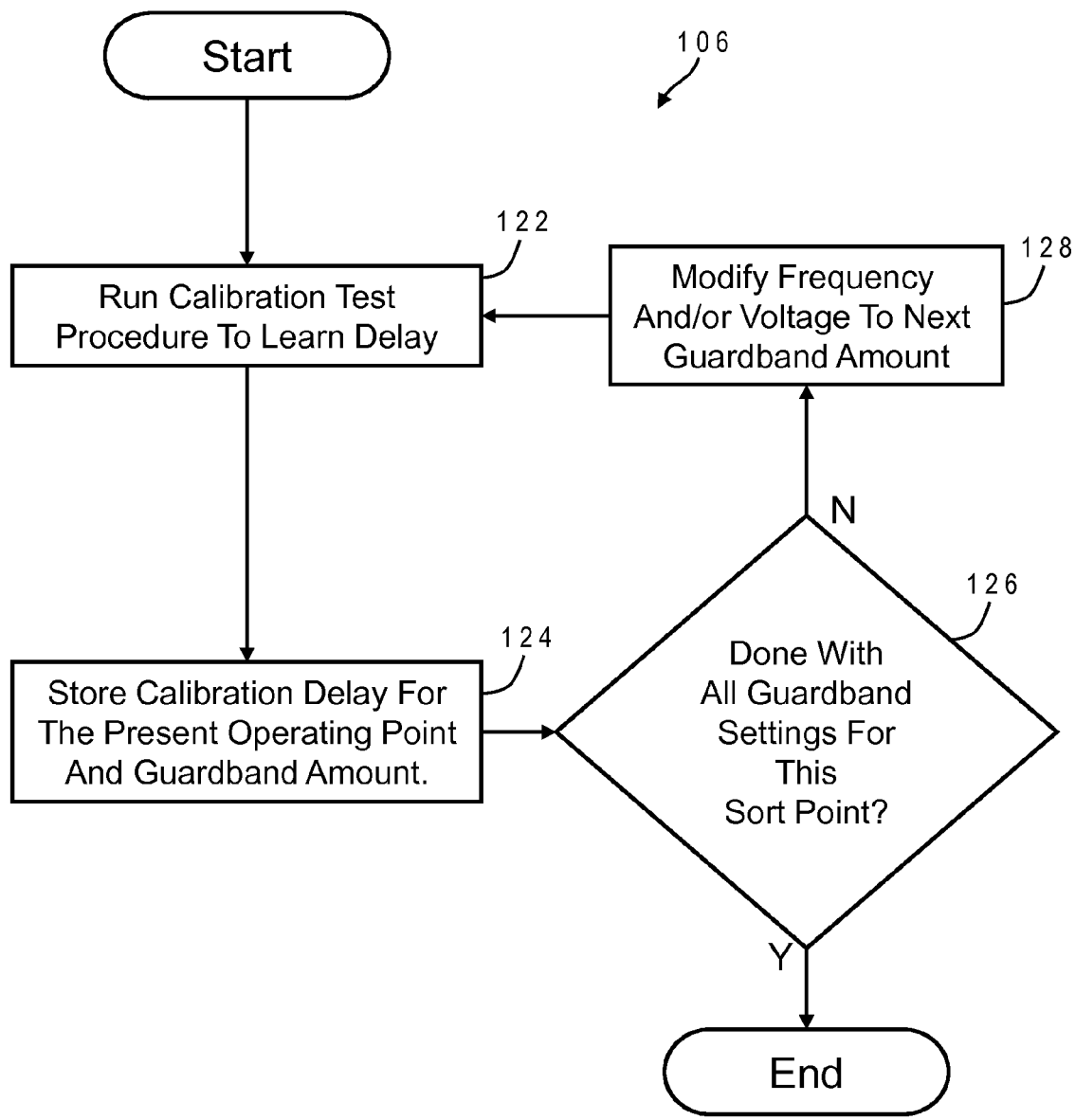
FIG. 8 is a chart illustrating the logical flow for a calibration procedure in accordance with a specific implementation of the present invention.
Figure 9:
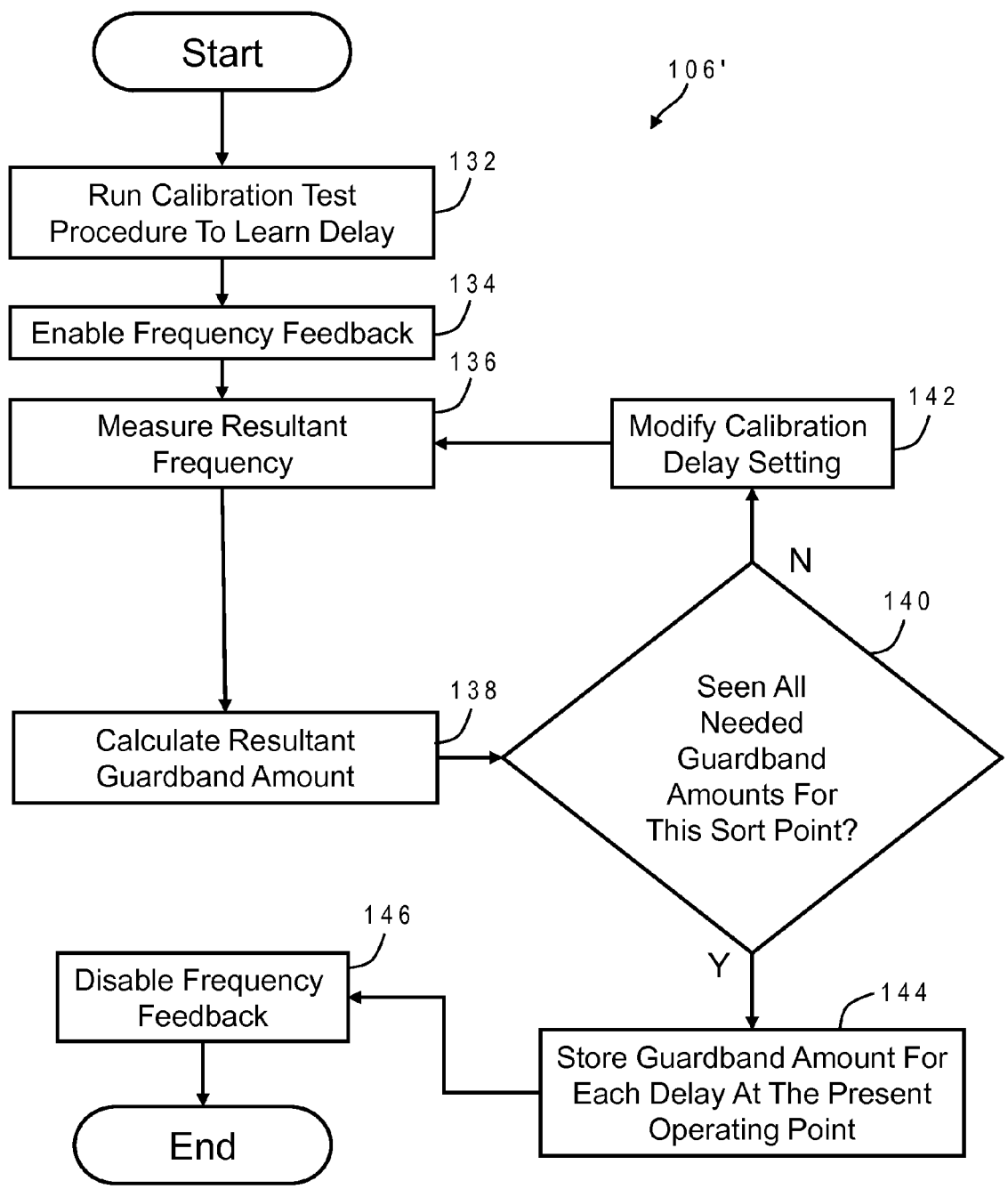
FIG. 9 is a chart illustrating the logical flow for a calibration procedure in accordance with another specific implementation of the present invention.

The present invention may be further understood with reference to the charts of FIGS. 7-9 which illustrate the logical flow for guardband calibration procedures in accordance with various implementations. FIG. 7 illustrates a base calibration technique 100 for carrying out the present invention which begins with the processor or other device operating at a nominal operating point (102). The chip is set to a desired (candidate) guardband frequency, temperature and voltage for this operating point (104), and calibration is performed as described further below (106). If there are more operational points to test (108) then the next operating point is selected (110), and the process repeats iteratively at box 104. Once calibration information has been recorded for all operating points, the process is complete.

FIG. 8 illustrates one preferred method 106 for performing the calibration of FIG. 7. The process begins by running a calibration test procedure to determine a current delay for the critical path used by the CPM (122). The calibration delay and guardband amount for the current operating point are stored (124) by the testing logic. If there are more guardband settings to test for this sort (operating) point (126), then the test logic modifies the frequency and/or voltage to achieve the next guardband amount (128), and the process repeats iteratively at box 122 until calibration delays are stored for all guardband settings. This method would then be repeated for each of the operating points per FIG. 7.

FIG. 9 illustrates another preferred process 106' for performing the calibration of FIG. 7. The process again begins by running a calibration test procedure to determine a current delay for the critical path used by the CPM (132), after which the system enables frequency feedback (134). The resultant frequency is measured (136), and a resultant guardband amount is calculated (138). If there are more guardband amounts for this sort point (140), then the calibration delay setting is modified (142), and the process repeats iteratively at box 136. Once all guardband amounts have been processed they are stored for each delay at the current operating point (144), and frequency feedback is disabled (146). This method would then be repeated for each of the operating points per FIG. 7.

Since each calibration delay results in a different amount of guardband, it is useful to collect the resultant frequency at multiple calibration settings to obtain a range of guardband amounts that can be selected later during system test of the IC. The amount of guardband selected could be based on a customer's aversion to risk or willingness to sacrifice reliability for either performance or energy efficiency.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, the invention has been described with reference to a specific example for a critical path monitor, but other CPM designs may be employed, and the invention is more generally applicable to any device or system having a monitor that controls the clock frequency as a function of the current operating environment and calibration settings. It is therefore contemplated that such modifications can be made without departing from the spirit or scope of the present invention as defined in the appended claims.

What is claimed is:

1. A method of guardband validation for an electronic device having a monitor which controls one or more operational parameters of the electronic device based on current operating conditions, comprising:
    functionally operating the electronic device while the monitor is active, wherein the monitor includes a calibration circuit;
    applying multiple calibration settings to the calibration circuit of the monitor during said operating;
    for each calibration setting, recording a corresponding guardband amount;
    selecting one of the guardband amounts for validation; and
    carrying out guardband testing of the electronic device while the monitor is active using the calibration setting that corresponds to the selected guardband amount.

2. The method of claim 1 wherein the multiple calibration settings are based on multiple calibration delays for at least one critical path used by the monitor.

3. The method of claim 2 wherein the at least one critical path is selected from among a plurality of critical paths to most closely track a maximum operating frequency of the electronic device over an operating voltage range of the electronic device.

4. The method of claim 2 wherein a calibration test procedure is used to determine the calibration delays for different operating frequencies or voltages.

5. The method of claim 2 wherein the calibration delays are set and resultant frequencies are measured which are used to calculate the guardband amounts.

6. The method of claim 2 wherein the calibration circuit is a calibration delay circuit which provides a calibrated delay signal to a critical path synthesis circuit, and the multiple calibration delays are set by changing delay taps of the calibration delay circuit.

7. The method of claim 6 wherein the delay taps are changed in response to a bias delay signal from power management control logic.

8. The method of claim 1 wherein said functionally operating the electronic device includes operating the electronic device at more than one operating point.

9. The method of claim 8 wherein the selected guardband amount lies between a maximum stress guardband and a minimum stress guardband, the maximum stress guardband being less than a minimum nominal guardband which accounts for frequency mistracking across the operating points due to calibration inaccuracy.

10. A method of guardband testing a processor having a critical path monitor used to optimize processor frequency, comprising:
    calibrating the critical path monitor for normal operation of the processor using at least one production calibration point applied to a calibration circuit of the critical path monitor which results in a normal operational timing margin for the processor;
    recalibrating the critical path monitor using at least one shifted calibration point different from the production calibration point applied to the calibration circuit which results in a reduced timing margin for the processor that is less than the normal operational timing margin; and
    carrying out guardband testing of the processor while the critical path monitor is active using the at least one shifted calibration point.

11. The method of claim 10 wherein the shifted calibration point is an additional calibration point for the critical path monitor set by power management logic.

12. The method of claim 10 wherein the critical path monitor is recalibrated using multiple calibration points which together form a linear piecewise fit against a curve of a maximum operational frequency of the processor versus an operating voltage of the processor.

13. The method of claim 10 wherein the calibration circuit is a calibration delay circuit which provides a calibrated delay signal to a critical path synthesis circuit, and the shifted calibration point is set by changing delay taps of the calibration delay circuit until a desired guardband frequency is reached.

14. The method of claim 10 wherein the delay taps are changed in response to a bias delay signal from power management control logic.

15. The method of claim 10 wherein the shifted calibration point is based on a calibration delay for at least one critical path used by the critical path monitor, the at least one critical path being selected from among a plurality of critical paths to most closely track a maximum operating frequency of the processor over an operating voltage range of the processor.

16. The method of claim 15 wherein the reduced timing margin corresponds to a guardband amount between a maximum stress guardband and a minimum stress guardband, the maximum stress guardband being less than a minimum nominal guardband which accounts for frequency mistracking across at least two operating points due to calibration inaccuracy.

17. A computer system comprising:
    one or more processors which process program instructions, at least one of said processors having at least one critical path monitor which controls a functional clock frequency of the at least one processor based on current operating conditions, the at least one critical path monitor having a calibration circuit with at least one production calibration setting for said calibration circuit which results in a normal operational timing margin for the at least one processor;

a memory hierarchy connected to said one or more processors; and power management control logic which applies at least one bias calibration setting to said calibration circuit of said critical path monitor for guardband testing, resulting in a reduced timing margin for the processor that is less than the normal operational timing margin.

18. The computer system of claim 17 wherein said power management control logic applies multiple bias calibration settings to said critical path monitor during a functional operation of the processor, and records a corresponding guardband amount for each calibration setting to allow later selection of a desired one of the guardband amounts by applying the bias calibration setting which corresponds to the desired guardband amount to said critical path monitor.

19. The computer system of claim 17 wherein said calibration circuit is a calibration delay circuit which provides a calibrated delay signal to a critical path synthesis circuit, and the bias calibration setting is applied by changing delay taps of the calibration delay circuit in response to a bias delay signal from said power management control logic until a desired guardband frequency is reached.

20. The computer system of claim 17 wherein the bias calibration setting is based on a calibration delay for at least one critical path used by the at least one critical path monitor, the at least one critical path being selected from among a plurality of critical paths to most closely track a maximum operating frequency of the processor over an operating voltage range of the processor.

21. The computer system of claim 20 wherein the reduced timing margin corresponds to a guardband amount between a maximum stress guardband and a minimum stress guardband, the maximum stress guardband being less than a minimum nominal guardband which accounts for frequency mistracking across at least two operating points due to calibration inaccuracy.

22. In a computer system having at least one device whose frequency is controlled by a monitor based on current operating conditions using a normal calibration setting for a calibration circuit of the monitor which results in a normal operational guardband, the improvement comprising:

power management control logic which (i) applies multiple bias calibration settings to the calibration circuit of the monitor during a functional operation of the device wherein the multiple bias calibration settings result in stress guardbands for the device which are less than the normal operational guardband, (ii) records a corresponding guardband amount for each calibration setting and (iii) in response to a selection of a desired one of the guardband amounts, applies the bias calibration setting corresponding to the desired guardband amount to the calibration circuit of the monitor, resulting in a reduced timing margin for the device.

23. The improvement of claim 22 wherein the monitor is a critical path monitor, and the calibration circuit is a calibration delay circuit for the critical path monitor, wherein the bias calibration setting is applied by changing delay taps of the calibration delay circuit in response to a bias delay signal from said power management control logic until a desired guardband frequency is reached.

24. The improvement of claim 23 wherein:

the bias calibration setting is based on a calibration delay for at least one critical path used by the critical path monitor, the at least one critical path being selected from among a plurality of critical paths to most closely track a maximum operating frequency of the device over an operating voltage range of the device; and the reduced timing margin corresponds to a guardband amount between a maximum stress guardband and a minimum stress guardband, the maximum stress guardband being less than a minimum nominal guardband which accounts for frequency mistracking across at least two operating points due to calibration inaccuracy.

\* \* \* \* \*